United States Patent
Churchill et al.

(10) Patent No.: US 10,162,629 B1
(45) Date of Patent: Dec. 25, 2018

(54) COMPILER INDEPENDENT IDENTIFICATION OF APPLICATION COMPONENTS

(71) Applicant: VMware, Inc., Palo Alto, CA (US)

(72) Inventors: Berkeley Churchill, Bothell, WA (US); Eric Schkufza, Oakland, CA (US)

(73) Assignee: VMWARE, INC., Palo Alto, CA (US)

( * ) Notice: Subject to any disclaimer, the term of this patent is extended or adjusted under 35 U.S.C. 154(b) by 25 days.

(21) Appl. No.: 15/612,097

(22) Filed: Jun. 2, 2017

(51) Int. Cl.
    G06F 9/44 (2018.01)
    G06F 8/71 (2018.01)
    G06F 11/36 (2006.01)

(52) U.S. Cl.
    CPC ............ G06F 8/71 (2013.01); G06F 11/3668 (2013.01)

(58) Field of Classification Search
    CPC ............................... G06F 8/71; G06F 11/3668
    USPC ........................................................ 717/120
    See application file for complete search history.

(56) References Cited

U.S. PATENT DOCUMENTS

| 6,438,560 | B1 * | 8/2002 | Loen | .................. G06F 17/30607 |
| | | | | 707/769 |
| 7,940,648 | B1 * | 5/2011 | Suwala | ............... H04L 12/4633 |
| | | | | 370/218 |
| 2006/0106977 | A1 * | 5/2006 | Eatherton | ......... G06F 17/30982 |
| | | | | 711/108 |
| 2010/0274755 | A1 * | 10/2010 | Stewart | ..................... G06F 8/75 |
| | | | | 706/54 |
| 2016/0380771 | A1 * | 12/2016 | Pepin | ..................... G06F 21/44 |
| | | | | 713/187 |

OTHER PUBLICATIONS

S. Bansal et al. "Automatic Generation of peephole superoptimizers", Architectural Support for Programming Languages and Operating Systems (ASPLOS), p. 394-403, 2006.
A. Chavez et al. "Software component licensing issues: A primer", IEEE software, 15(5), 1998.
S.F. Chen et al. "An empirical study of smoothing techniques for language modeling", Association for Computational Linguistics, p. 310-318, 1996.
B. Churchill et al. "STOKE" 2016, https://github.com/StanfordPL/stoke.
B. Churchill et al. "Sound Loop Superoptimization for google native client (to appear)", Architectural Support for Programming Languages and Operating Systems (ASPLOS), 2017.
J. Davies et al. "Software bertillonage: finding the provenance of an entity", Mining Software Repositories, p. 183-192, 2011.

(Continued)

Primary Examiner — Anna C Deng
(74) Attorney, Agent, or Firm — Thomas Horstemeyer, LLP

(57) ABSTRACT

Disclosed are various embodiments for compiler independent identification of application components. A procedure in a compiled binary application is identified. Then, a first compiler independent hash value for the procedure is generated, the compiler independent hash value representing a set of memory dereferences occurring in a heap, and the set of memory dereferences relying in part on a set of inputs for the procedure. Next, it is determined whether the first compiler independent hash value matches a second compiler independent hash value associated with a known procedure in a known source code file.

20 Claims, 4 Drawing Sheets

(56) References Cited

OTHER PUBLICATIONS

P.T. Devanbu et al. "Software engineering for security: A roadmap", Proceedings of the Conference on The Future of Software Engineering, ICSE '00, p. 227-239, 2000.
F.S. Foundation, GNU general public license 2007, https://www.gnu.org/licenses/gpl-3.0.en.html.
S. Heule et al. "Stratified synthesis: Automatically learning the x86-64 instruction set", Programming Language Design and Implementation (PLDI), p. 237-250, 2016.
X. Hu et al. "Large-scale malware indexing using function-call graphs", Computer and Communications Security, p. 611-620, 2009.
T. Ishio et al. "Software ingredients: detection of third-party component reuse in java software release", MSR, 2016.
E.R. Jacobson et al. "Labeling library functions in stripped binaries", Program Analysis for Software Tools (PASTE), 2011 p. 1-8, 2011.
D. Jurafsky et al. "Naive bayes and sentiment classification", Speech and Language Processing, 6, 2016 https://web.stanford.edu/jurafsky/slp3/.
J. Kazmierska et al. "Application of the naive bayesian classifier to optimize treatment decision", Radiotherapy and Oncology, 86(2):211-216, 2008.
A. Khan et al. "A review of machine learning algorithm for text-documents classification", Journal of Advances in Information Technology, vol. 2010.
C. Kruegel et al. "Static Disassembly of obfuscated binaries", USENIX Security Symposium, p. 18-18, 2004.
Z. Li et al. "Cp-miner: Finding copy-paste and related bugs in large-scale software code", IEEE Transactions on software Engineering, 32(3):176-192, 2006.
H. Massalin "Superoptimizer: A look at the smallest program", Architectural Support for Programming Languages and Operating Systems (ASPLOS), p. 122-126, 1987.

N.H. Pham et al. "Detection of recurring software vulnerabilities", Automated Software Engineering (ASE), p. 447-456, 2010.
P.M. Phothilimthana et al. "Scaling up superoptimization", Architectural Support for Programming Languages and Operating Systems (ASPLOS), p. 297-310, 2016.
J. Qiu et al. "Library functions identification in binary code by using graph isomorphism testing", Software Analysis, Evaluation, and Reengineering (SANER), p. 261-170, 2015.
D. Rattan et al. "Software clone detection: A systematic review", Information and Software Technology, 55 (7):1165-1199, 2013.
I. Rish "Am empirical study of the naive bayes classifier", Workshop on empirical methods in artificial intelligence (IJCAI), 3:41-46, 2001.
V. Roussev et al. "Multi-resolution similarity hashing", Digital Investigations, 4:105-113, 2007.
C.K. Roy "Comparison and evaluation of code clone detection techniques and tools: A qualitative approach", Science of Computer Programming, 74(7):470-495, 2009.
C.K. Roy "The vision of software clone management: Past, present, and future", Software Maintenance, Reengineering and Reverse Engineering (CSMR-WCRE), p. 18-33, 2014.
E. Schkufza et al. "Stochastic optimization of floating-point programs with tunable precision", PLDI, p. 9, 2014.
D. Schleimer et al. "Local algorithms for document fingerprinting", International Conference on Management of Data (SIGMOD), p. 76-85, 2003.
E.C.R. Shin et al. "Recognizing functions in binaries with neural networks", USENIX Conference on Security Symposium, p. 611-626, 2015.
Q. Wang et al. "Naive bayesian classifier for rapid assignment of rrna sequences into the new bacterial taxonomy", Applied and environmental microbiology, 73(16):5261-5267, 2007.
E.J. Weyuker "Testing component-based software: A cautionary tale", IEEE software, 15(5), 1998.
L. Zhang et al. "Analysis of ssl certificate reissues and revocations in the wake of heartbleed", Internet Measurement Conference (IMC), p. 489-502, 2014.

* cited by examiner

COMPILER INDEPENDENT IDENTIFICATION OF APPLICATION COMPONENTS

BACKGROUND

Enterprises often use automated tools to identify components of applications for licensing compliance purposes. For example, an enterprise can use a source code analysis tool to identify libraries, functions, or application programming interfaces (API's) that are subject to open source licenses such as various versions of the GNU Public License (GPL). Source code analysis tools can rely on textual comparisons to known samples of open source licensed code or a comparison of the uniquely identifying hash value of a function or file in a given source code to the hash value of a known sample of open source licensed code.

However, an enterprise is not always guaranteed to have access to the source code of an application. In these instances, code scanning tools can attempt to compare a signature (e.g., a hash value for a compiled open source licensed library) of known open source licensed code to individual portions of a compiled application. In other instances, code scanning tools can also attempt to do a byte-by-byte comparison of a portion of a compiled application to samples of a compiled open source licensed library. However, these approaches often fail to identity the compiled instance of open source licensed code because the compiled instance of code being analyzed can have been generated with a different compiler, different version of a compiler, or with different compiler optimization flags than were used to generate the sample.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for identifying components included in a compiled binary of an application independent of the compiler used to create the compiled binary. An application will be analyzed to identify the various procedures and sub-procedures contained therein. A compiler independent hash is then created for each of the procedures and sub-procedures. The compiler independent hash can be based at least in part on the features of a procedure or sub-procedure that are treated in a consistent manner across compilers or different optimization levels of the same compiler. The compiler independent hash can then be compared to a library of known code samples. If the compiler independent hash of a function in the compiled binary of the application matches a compiler independent hash of a function in the library of known code samples, this can be interpreted as evidence that the matching known code sample is included in the compiled binary of the application. Using the following approaches, a database of components of a compiled binary of an application can be constructed in linear time with respect to the size of the binary or number of components of the binary being analyzed, in contrast to other approaches which are executed in quadratic time with respect to the size of the binary or number of components of the binary being analyzed. The database can be then be queried in constant time to determine whether a particular component is present in the compiled binary of the application. Due to the quadratic run time, other approaches may be effectively unusable on larger binaries of applications or binaries of applications that contain a large number of components. In the following discussion, a general description of the system and its components is provided, followed by a discussion of the operation of the same.

Figure 1:
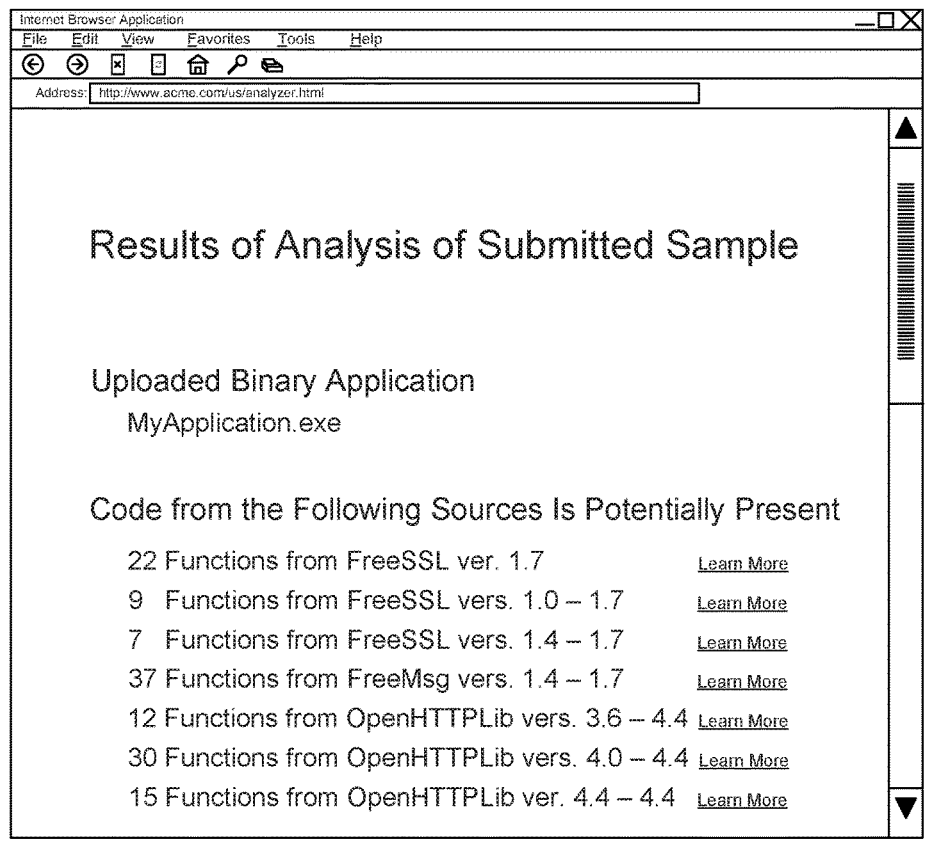
FIG. 1 is a drawing depicting one of several embodiments of the present disclosure.

FIG. 1 illustrates an example of the operation of various embodiments of the present disclosure. FIG. 1 depicts a user interface 100, such as a browser window. However, operation of various embodiments of the present disclosure may occur in other user interface contexts. For example, various embodiments of the present disclosure may operate within an integrated development environment (IDE), as a stand-alone application, or in some other user interface context.

In FIG. 1, the results of the operation of an embodiment of the present disclosure are displayed within the user interface 100. As shown, a user has previously uploaded a binary application file entitled "MyApplication.exe" for analysis. The results of the analysis are presented to the user within the user interface 100. As shown, evidence that functions from a number of other sources is presented to the user. For example, a number of functions from the "FreeSSL," "FreeMsg," "OpenHTTPLib" are identified as being potentially present in the compiled binary "MyApplication.exe." In some instances, a function may be present in multiple versions of a library, and this information is reflected as well in the user interface 100.

Figure 2:
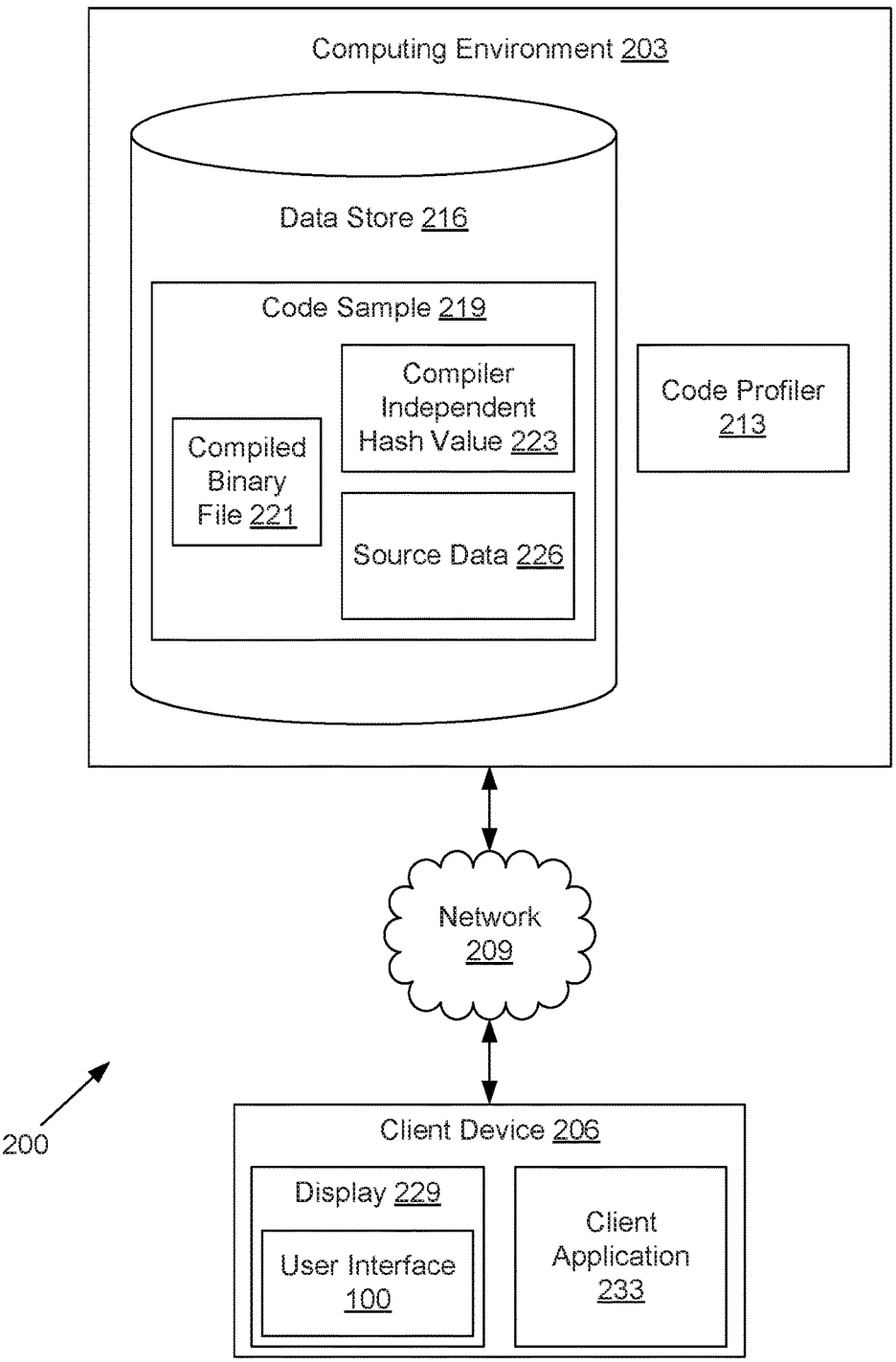
FIG. 2 is a drawing of a networked environment according to various embodiments of the present disclosure.

With reference to FIG. 2, shown is a networked environment 200 according to various embodiments. The networked environment 200 includes a computing environment 203 and a client device 206, which are in data communication with each other via a network 209. The network 209 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The computing environment 203 can include, for example, a server computer or any other system providing computing capability. Alternatively, the computing environment 203 can employ a plurality of computing devices that can be arranged, for example, in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203 according to various embodiments. The components executed on the computing environment 203, for example, include a code profiler 213. Other applications, services, processes, systems, engines, or functionality not discussed in detail herein can also be executed in the computing environment 203.

The code profiler 213 is executed to identify the source or origins of code contained in a compiled binary of an application. Accordingly, the code profiler 213 can analyze a compiled binary, identify the procedures or functions contained therein, and determine their origin. To improve the accuracy of identification, the code profiler 213 can make use of compiler independent techniques discussed in further detail herein.

Also, various data is stored in a data store 216 that is accessible to the computing environment 203. The data store 216 can be representative of a plurality of data stores 216, which can include relational databases, object-oriented databases, hierarchical databases, hash tables or similar key-value data stores, as well as other data storage applications or data structures. The data stored in the data store 216 is associated with the operation of the various applications or functional entities described below. This data can include one or more code samples 219 and potentially other data.

A code sample 219 can represent an instance of a compiled binary file 221 of known applications that have had a compiler independent hash value 223 generated for them. A code sample 219 could correspond to an entire binary (e.g., an application, a dynamically loaded library, or other compiled binary file), or a portion thereof (e.g., an individual function, routine, subroutine, or collection of functions, routines, or subroutines within a compiled binary). The compiled binary file 221 can represent the instance of an application for which a compiler independent hash value 223 will be stored. The use of a library of code samples 219 allows for the code profiler 213 to analyze an unknown binary file to determine whether one or more functions or routines from particular applications or libraries are included therein.

The compiler independent hash value 223 represents a set of memory accesses performed by one or more of the procedures represented by the code sample 219. The set of memory accesses used to form the compiler independent hash value 223 are those memory accesses which are unlikely to be modified by a compiler toolchain. Different compiler toolchains, as well as different levels of optimization by a compiler toolchain, may make different use of the stack or produce different control flow orderings with respect to reads and writes. For example, loop unrolling and function inlining may change the control flow of a function by removing repetitive accesses to a memory location as well as changing reads and writes to the stack. However, accesses to memory locations in the heap rarely differ between compiled binaries produced by different compiler toolchains or different levels of optimization. Therefore, in some example implementations, the compiler independent hash value 223 could represent a set of memory dereferences occurring in a heap, the set of memory dereferences relying in part on a set of inputs for the procedure. In these examples, each memory dereference in the set of memory dereferences can be represented by a tuple that includes the address in memory at which the memory dereference occurs, the size of or amount of memory being dereferenced, and the type of memory dereference occurring.

The source data 226 represents the origin of the compiled binary file 221 of the code sample 219. The source data 226 can include, for example, the author or authors of the source code used to generate the compiled binary file 221. The source data 226 can also include the identity of the application, library, or software project used to generate the compiled binary file 221. In some instances, the source data 226 can also include additional information such as the version or versions of the application, library, or software project to which the compiled binary file 221 corresponds.

For example, some functions or versions of functions may only appear in certain versions of a library or application. As new capabilities are added to a library or application, functions not present in earlier versions may appear in later versions. Likewise, obsolete functions (e.g., procedures for performing obsolete or insecure cryptographic operations) may be removed in later versions of an application or library. Similarly, a function may change from version to version as bug-fixes are added to address various issues.

The client device 206 is representative of a plurality of client devices 206 that can be coupled to the network 209. The client device 206 can include, for example, a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 206 can include one or more displays 229, such as liquid crystal displays (LCDs), gas plasma-based flat panel displays, organic light emitting diode (OLED) displays, electrophoretic ink ("E-ink") displays, projectors, or other types of display devices. In some instances, the display 229 can be a component of the client device 206 or can be connected to the client device 206 through a wired or wireless connection.

The client device 206 can be configured to execute various applications such as a client application 233 or other applications. The client application 233 can be executed in a client device 206, for example, to access network content served up by the computing environment 203 or other servers, thereby rendering a user interface 100 on the display 229. To this end, the client application 233 can include, for example, a browser, a dedicated application, or other executable and the user interface 100 can include a network page, an application screen, or other user mechanism for obtaining user input. The client device 206 can be configured to execute applications beyond the client application 233 such as, for example, email applications, social networking applications, word processors, spreadsheets, or other applications.

Next, a general description of the operation of the various components of the networked environment 200 is provided. To begin, one or more code samples 219 are loaded into the data store 216. The code samples 219 may be uploaded using the client application 233 or transferred from another data store 216. The code samples 219 may also include all of the desired source data 226. However, in some instances, the source data 226 may be manually provided (e.g., via a data entry mechanism provided by the client application 233).

The code profiler 213 can then be used to generate a compiler independent hash value 223 for each code sample 219. To generate the compiler independent hash value 223, the code profiler 213 may perform static analysis of the compiled binary file 221 to identify one or more functions or routines within the compiled binary file 221. In some embodiments, the code profiler 213 may also perform dynamic analysis of the compiled binary file 221 to identify one or more functions or routines within the compiled binary file 221. The dynamic analysis may be performed in lieu of or in addition to static analysis. The code profiler 213 can then identify a set of memory accesses performed by each function or routine within the compiled binary 221 and store the identified set of memory accesses as the compiler independent hash value 223 for the code sample 219.

Subsequently, the code profiler 213 can receive a compiled binary of an application for analysis in order to determine whether one or more functions from one or more code samples 219 are present. Accordingly, the code profiler 213 can first perform static analysis on the received compiled binary to identify the individual functions or routines within the compiled binary. The code profiler 213 can then generate a compiler independent hash value 223 for each function or routine identified within the compiled binary. Subsequently, the code profiler 213 can then compare the generated compiler independent hash values 223 to the compiler independent hash values 223 of the stored samples to determine if there is a match. If a compiler independent hash value 223 for one of the functions within the received compiled binary matches a compiler independent hash value 223 for a code sample 219, the code profiler 213 may conclude that the underlying source code for the code sample 219 was used to generate the received compiled binary.

Figure 3:
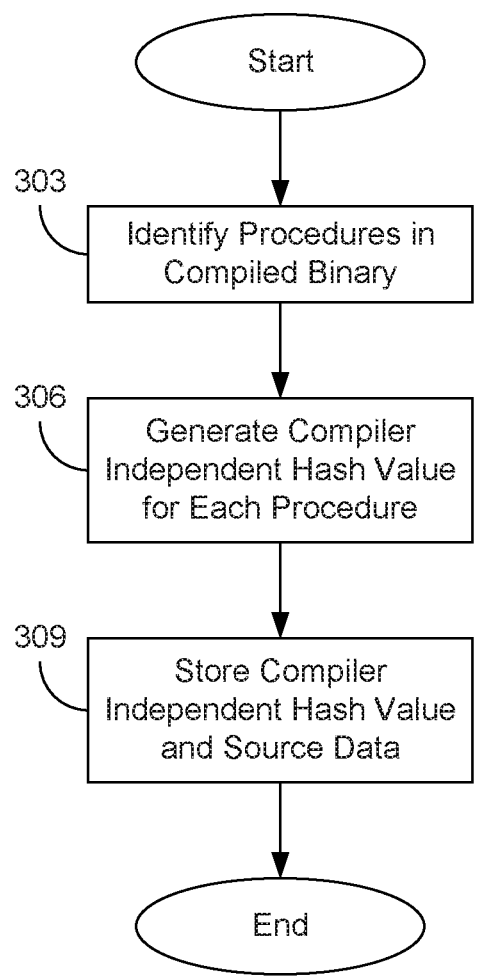
FIG. 3 is a flowchart illustrating one example of functionality implemented as portions of an application executed in a computing environment in the networked environment of FIG. 2 according to various embodiments of the present disclosure.

Referring next to FIG. 3, shown is a flowchart that provides one example of the operation of a portion of the code profiler 213 according to various embodiments. It is understood that the flowchart of FIG. 3 provides merely an example of the many different types of functional arrangements that can be employed to implement the operation of the portion of the code profiler 213 as described herein. As an alternative, the flowchart of FIG. 3 can be viewed as depicting an example of elements of a method implemented in the computing environment 203 according to one or more embodiments.

Beginning with step 303, the code profiler 213 can perform static analysis of a compiled binary file to identify one or more procedures or functions within the compiled binary file. Static analysis is the analysis of computer software performed without actually executing the computer software. One example of static analysis includes symbolic execution, where a program is analyzed to determine which inputs cause each part of a program to execute. Another example of static analysis includes data flow analysis to model the flow of a program's execution. Other types of static analysis may be used as appropriate for various implementations.

The following example static analysis approach may be used in some instances of the present disclosure. The example static analysis models the state of a processor at every program point in a procedure as a tuple $(\rho, \sigma, \eta)$, which contains the register map $\rho: R \rightarrow V$, the stack map $\sigma: Z \rightarrow V$, and the heap set $\eta$, which contains tuples in the form of (address, size, mode).

First, the instructions in a code sequence, such as a sequence of the machine readable instructions of the compiled binary file 221, are transformed into a series of three-address codes, which are an intermediate code used to represent the assembly language of the machine readable instructions of the compiled binary file 221. As an example, for the x86-64 instruction set, the following three-address language may be used to model the machine readable instructions:

$$Instr = r \leftarrow op_1 + op_2 \mid r \leftarrow op_1 - op_2$$
$$\mid r \leftarrow op * n \mid r \leftarrow op << n$$
$$\mid r \leftarrow op \mid r \leftarrow \bot \mid$$
$$\mid \text{label}$$
$$\mid \text{jump label} \mid cjump \text{ label} \mid ret$$
$$\mid r \leftarrow \text{read}(a, n) \mid \text{write}(a, op, n)$$
$$a \in Addr = (n_{\textit{off}}, r_{base}, r_{index}, n_{scale})$$
$$op \in OP = r \mid n \in \mathbb{Z}_{2^{64}}$$
$$r \in R = rax \mid rdx \mid \ldots$$

The instructions of this language cover linear arithmetic (addition, substraction, scalar multiplication, and scalar left shift), memory reads, memory writes, conditional jumps, and unconditional jumps. Of note is the $r \leftarrow \bot$ instruction, which represents any operation that mutates r. The language is defined in terms of 64-bit registers because it is focused on values that are used as pointers in the x86-64 instruction set. However, appropriate adjustments can be made for other instruction sets. For example, the language could be modified to be defined in terms of 32-bit registers for the x86 instruction set. Other, additional modifications could be made for other instruction set architectures (e.g., ARM, MIPS, POWER, SPARC, or z/Architecture).

This analysis models the value of registers, stack locations, and pointers as linear combinations of the initial register values observed on entry into a procedure. If $R=\{rax, rdx, \ldots\}$ for the set of x86-64 registers and for $r \in R$, $r_0$ denotes the initial value of r, then the value $v \in V$ can be one of two types: either the unknown value $\bot$ or a linear combination of the form shown below in Equation (1) where $a_c$ and $a_r$ are 64-bit constants and arithmetic is defined in terms of bitvectors:

$$v = a_c + \Sigma_{r \in R} a_r * r_0 \qquad (1).$$

This example analysis models the state of an x86-64 processor with a symbolic value for every register and distinct stack location. The stack is modeled as an unbounded array of 64-bit values where the ith entry corresponds to the memory location indexed by the value of $-4i + rsp_0$. The pointers of this form can refer to the stack locations.

This example analysis further models writes to and reads from the heap. Any values which are written to the heap and then subsequently read back are assigned the value of $\bot$.

This simplification in this example analysis may be implemented because accurately modeling the heap requires knowledge of aliasing relationships over the input registers, which is generally unavailable in the absence of an expensive interprocedural analysis. The example analysis tracks the set of η of dereferences performed. For each dereference, the address of the dereference, whether the dereference is a read or a write, and the size of the dereference (e.g., the size in bytes) is recorded as a tuple.

This example analysis can also use a transfer function for linear arithmetic instructions. The operation can be applied to the current register map and the symbolic value which represents the result is stored at the appropriate location. Control flow can be represented as nops or otherwise ignored. The transfer function for memory reads, which captures the memory abstraction described above, is reproduced below:

8-byte read from a known stack location $$\frac{r \leftarrow \text{read}(a, 8) \rho(a) = rsp - 8i}{\rho' = \rho[r/\sigma(i)]}$$

Read from an unknown stack location $$\frac{r \leftarrow \text{read}(a, n) \rho(a) = n * rsp + v}{\rho' = \rho[r/\bot]}$$

Read from a heap location $$\frac{r \leftarrow \text{read}(a, n) \rho(a) \neq n * rsp + v}{\rho' = \rho[r/\bot] \eta' = \eta \cup \{(\rho(a), n, \text{read})\}}$$

Reads from locations on the stack which can be represented by linear functions of rsp return symbolic values whereas all other reads return ⊥. The transfer function for writes is analogous to the transfer function for reads.

Moving to step 306, the code profiler 213 can generate a compiler independent hash value 223 for each procedure identified in step 303. To generate the compiler independent hash value, the code profiler 213 first enumerates all control flow paths through a procedure which do not pass through any basic block more than once. This results in a superset of all of the memory dereferences that the procedure makes for the heap being identified.

In some embodiments, the maximum number of paths to be followed can be specified and any paths beyond the maximum number can be ignored to prevent an exponential increase in processing time as additional control flow paths are added to the set of control flow paths to be followed. The value for the maximum number of paths can be specified based on the level of accuracy desired, with more control paths potentially allowing for a more precise compiler independent hash value 223 to be computed. However, an all paths approach may be used in some implementations where the additional accuracy is required.

For each control flow path, the transform function defined above can be applied beginning at the initial state of the control flow path. H can be defined as the set union over the heap sets obtained at the end of each control flow path, which can be viewed as the superset of all of the memory dereferences that a procedure makes for the heap. In some instances, however, individual elements may be removed from H if they fail to meet certain criteria or skipped and not added to H. For example, memory dereferences occurring within a loop may be removed from H in some embodiments or skipped and not added to H in others. As another example, memory dereferences occurring after a call instruction or an indirect jump may also be removed from H in some embodiments or skipped and not added to H in others. Likewise, a memory dereference in the heap that depends on a value obtained from another memory dereference may be removed from H in some embodiments or skipped and not added to H in others. As a further example, a memory dereference that is not a linear function of the registers used at the entry of the procedure may also be removed from H in some embodiments or skipped and not added to H in others. Finally, the elements of H can be treated as strings, sorted lexicographically, and have a string hash (e.g., the djb2 string hash) applied, which results in the compiler independent hash value 223 for the procedure.

An example of the process for applying the transfer function to each instruction is provided below. Using the following assembly code instructions as an example,

| 1  | movq   | 0x28 (% rdi), %rdx |
| 2  | xorl   | %eax, %eax |
| 3  | movzwl | 0x3c(%rdi), %ecx |
| 4  | cmpq   | %rdx, %rsi |
| 5  | jb     | .L_exit |
| 6  | movzwl | %cx, %eax |
| 7  | subq   | %rdx, %rsi |
| 8  | movq   | %rax, %rdx |
| 9  | shlq   | $0x6, %rdx |
| 10 | cmpq   | %rdx, %rsi |
| 11 | movl   | $0x0, %edx |
| 12 | cmovb  | %rdx, %rax |
| 13 | .L_exit: | |
| 14 | retq   | |

The following series of three-address code operations and register map would result using the example analysis previously described.

| Three Address Code | | Analysis Example ρ |
|---|---|---|
| | 0 | (rdi → rdi$_0$) |
| 1  rdx ← read (0 x28 (% rdi), 8) | 1 | (rdi → rdi$_0$; rdx → ⊥) |
| 2  rax ← 0 | 2 | (rdi → rdi$_0$; rdx → ⊥; rax → 0) |
| 3  rcx ← read (0 x3c (% rdi), 2) | 3 | (rdi → rdi$_0$; rdx, rcx, rax → bottom) |
| 4  cjump . L_exit | 4 | |
| 5  rax ← ⊥ | 5 | (rdi → rdi$_0$; rdx, rcx, rax → bottom) |
| 6  rsi ← rsi - rdx | 6 | (rdi → rdi$_0$; rdx, rec, rax → bottom; rsi → ⊥) |
| 7  rdx ← rax | 7 | (rdi → rdi$_0$; rdx, rcx, rax → bottom; rsi → ⊥) |
| 8  rdx ← rdx <<6 | 8 | (rdi → rdi$_0$; rdx, rcx, rax → bottom; rsi → ⊥) |
| 9  rdx ← 0 | 9 | (rdi → rdi$_0$; rdx, rcx, rax → bottom; rsi → ⊥) |
| 10  rax ← ⊥ | 10 | (rdi → rdi$_0$; rdx, rcx, rax → bottom; rsi → ⊥) |
| 11  . L_exit | 11 | |
| 12  ret | 12 | (rdi → rdi$_0$; rdx, rcx, rax → bottom; rsi → ⊥) |

Here, a series of three-address codes are provided on the left. On the right is a register map ρ representing each point in the example program, assuming the execution does not the conditional jump on line 4. The analysis procedure described above produce the 8-byte read occurring at byte 0x28 from the address stored in register $rdi_0$ and the 2-byte read occurring at byte 0x3c from the address stored in register $rdi_0$. These two reads can be combined into the set of dereferences (($rdi_0$, 0x28, 8), ($rdi_0$, 0x3c, 2)) to represent the compiler independent hash value 223 for the procedure.

Referring next to step 309, the code profiler 213 can store the compiler independent hash value 223 generated at step 306 as a portion of the code sample 219. For example, the code profiler 213 can store the generated compiler independent hash value 223 along with any source data 226 provided for the code sample 219. After the compiler independent hash value 223 is stored, the process depicted in FIG. 3 ends.

Figure 4:
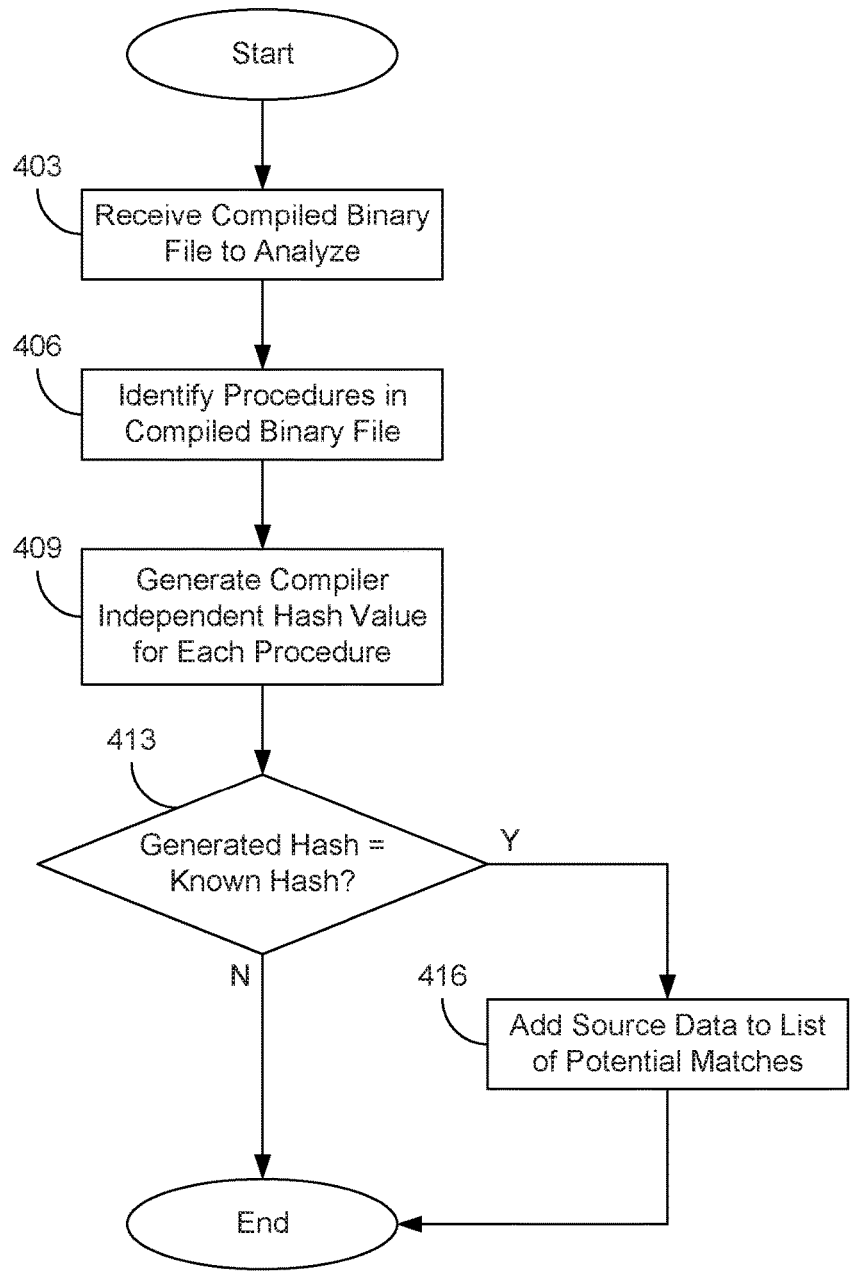
FIG. 4 is a flowchart illustrating one example of functionality implemented as portions of an application executed in a computing environment in the networked environment of FIG. 2 according to various embodiments of the present disclosure.

Referring next to FIG. 4, shown is a flowchart that provides one example of the operation of a portion of the code profiler 213 according to various embodiments. It is understood that the flowchart of FIG. 4 provides merely an example of the many different types of functional arrangements that can be employed to implement the operation of the portion of the code profiler 213 as described herein. As an alternative, the flowchart of FIG. 4 can be viewed as depicting an example of elements of a method implemented in the computing environment 203 according to one or more embodiments.

Beginning at step 403, the code profiler 213 can receive a compiled binary file to analyze. The compiled binary file to be analyzed may be provided to the code profiler 213 through a number of mechanisms. For example, a user may upload a copy of the compiled binary file from a client application 233 (e.g., a browser, an IDE, etc.).

Moving to step 406, the code profiler 213 can identify the procedures present in the compiled binary file to be analyzed. The procedures can be identified using various static analysis approaches. For example, the same or similar approaches described at step 303 in the discussion of FIG. 3 above can be similarly used to identify each of the procedures in the compiled binary file.

Referring next to step 409, the code profiler 213 can generate a compiler independent hash value 223 for each procedure identified at step 406. The compiler independent hash values 223 can be generated using a variety of approaches. For example, the same or similar approaches described at step 306 in the discussion of FIG. 3 above can be similarly used to generate a compiler independent hash value 223 for each procedure in the compiled binary file.

Proceeding to step 413, the code profiler 213 can compare the compiler independent hash value 223 generated at step 409 with the compiler independent hash values 223 of each code sample 219 stored in the data store 216. In some implementations, the code profiler 213 can determine whether an exact match between the compiler independent hash value 223 generated at step 409 and the compiler independent hash value 223 corresponding to the code sample 219 exists. If a match is found, the process continues to step 416. Otherwise, the process ends.

Moving to step 416, the code profiler 213 can add the source data 226 to a list of potential matches to be returned to the requesting client application 233. In some instances, a probability may be associated with the source data 226 added to the list of potential matches that reflects a likelihood that human readable source code from a particular code sample 219 has been included in the analyzed compiled binary file. For example, when a first compiler independent hash value 223 corresponding to a particular code sample 219 is identified, the source data 226 for the code sample 219 corresponding to the first compiler independent hash value 223 may be added to the list of potential matches along with a corresponding probability. As a second or subsequent compiler independent hash value 223 corresponding to the particular code sample 219 is identified, the corresponding probability may be increased to represent an increased likelihood that the particular code sample 219 is present in the analyzed compiled binary file. To illustrate this example, if a single compiler independent hash value 223 corresponding to a first code sample 219 is identified in the analyzed compiled binary file, the source data 226 associated with the first code sample 219 may be added to the list of potential matches along with a low probability (e.g., less than 5%, less than 10%, etc.) the first code sample 219 is included in the analyzed compiled binary file. Likewise, if forty-seven compiler independent hash values 223 corresponding to a second code sample 219 are identified in the analyzed compiled binary file, the source data 226 associated with the second code sample 219 may be added to the list of potential matches along with a high probability (e.g., greater than 80%, greater than 90%, etc.) that the second code sample 219 is included in the analyzed compiled binary file.

The list of potential matches can include information about each code sample 219 with a compiler independent hash value 223 that matches a respective compiler independent hash value 223 of the analyzed compiled binary file. For example, the list of potential matches can include source data 226 for each code sample 219 found to match the compiler independent hash value 223 produced at step 409. Where multiple code samples 219 have a compiler independent hash value 223 that matches the compiler independent hash value 223 generated at step 409 (e.g., multiple versions of the same library or application which contain the same function or procedure), the list of matches can contain source data 226 for each of the matching code samples 219. After adding the source data 226 to the list of matches, the process subsequently ends.

Although the code profiler 213, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 3 and FIG. 4 show the functionality and operation of an implementation of portions of the code profiler 213. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system or other system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts of FIG. 3 and FIG. 4 show a specific order of execution, it is understood that the order of execution can differ from that which is depicted. For example, the order of execution of two or more blocks can be scrambled relative to the order shown. Also, two or more blocks shown in succession in FIG. 3 or FIG. 4 can be executed concurrently or with partial concurrence. Further, in some embodiments, one or more of the blocks shown in FIG. 3 of FIG. 4 can be skipped or omitted. In addition, any number of counters, state variables, warning semaphores, or messages could be added to the logical flow described herein, for purposes of enhanced utility, accounting, performance measurement, or providing troubleshooting aids, etc. It is understood that all such variations are within the scope of the present disclosure.

Also, any logic or application described herein, including the code profiler 213, that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein, including the code profiler 213, can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine readable instructions stored in the memory that, when executed by the processor, cause the computing device to at least:
   identify a procedure in a compiled binary application;
   identify a superset of memory dereferences for the procedure occurring in a heap;
   remove from the superset of memory dereferences a memory dereference occurring in the heap that is located within a loop in the procedure to generate a first set of memory dereferences occurring in the heap, the first set of memory dereferences relying in part on a set of inputs for the procedure;
   generate a first compiler independent hash value for the procedure, the compiler independent hash value representing the first set of memory dereferences occurring in the heap; and
   determine that each memory dereference in the first set of memory dereferences of the first compiler independent hash value matches a respective memory dereference in a second set of memory dereferences of a second compiler independent hash value associated with a known procedure in a known source code file.

2. The system of claim 1, wherein the memory dereference is a first memory dereference and the machine readable instructions further cause the computing device to at least:
   remove from the superset of memory dereferences a second memory dereference occurring in the heap that occurs after a call instruction.

3. The system of claim 1, wherein the memory dereference is a first memory dereference and the machine readable instructions further cause the computing device to at least:
   remove from the superset of memory dereferences a second memory dereference of the heap that depends on a value obtained by a third memory dereference of the heap.

4. The system of claim 1, wherein the memory dereference is a first memory dereference and the machine readable instructions further cause the computing device to at least:
   remove from the superset of memory dereferences a second memory dereference that comprises an address that is not a linear function of a register used at an entry of the procedure.

5. The system of claim 1, wherein the memory dereference within the first set of memory dereferences comprises a tuple comprising an address of the memory dereference, a size of the memory dereference, and a type of the memory dereference.

6. The system of claim 1, wherein a second memory dereference within the second set of memory dereferences comprises a tuple comprising an address of the second memory dereference, a size of the second memory dereference, and a type of the second memory dereference.

7. The system of claim 1, wherein the memory dereference is a first memory dereference and the machine readable instructions further cause the computing device to at least remove from the superset of memory dereferences a second memory dereference occurring in the heap that occurs after an indirect jump.

8. A method comprising:
identifying a procedure in a compiled binary application;
identifying a superset of memory dereferences for the procedure occurring in a heap;
removing from the superset of memory dereferences a memory dereference occurring in the heap that occurs after at least one of a call instruction or an indirect jump to generate a first set of memory dereferences occurring in the heap;
generating a first compiler independent hash value for the procedure, the compiler independent hash value representing the first set of memory dereferences occurring in the heap; and
determining that each memory dereference in the first set of memory dereferences of the first compiler independent hash value matches a respective memory dereference in a second set of memory dereferences of a second compiler independent hash value associated with a known procedure in a known source code file.

9. The method of claim 8, wherein the memory dereference is a first memory dereference and the method further comprises:
removing from the superset of memory dereferences a second memory dereference occurring in the heap that is located within a loop in the procedure to generate the first set of memory dereferences occurring in the heap.

10. The method of claim 8, wherein the memory dereference is a first memory dereference and the method further comprises:
removing from the superset of memory dereferences a second memory dereference of the heap that depends on a value obtained by a third memory dereference of the heap.

11. The method of claim 8, wherein the memory dereference is a first memory dereference and the method further comprises:
removing from the superset of memory dereferences a second memory dereference comprises an address that is not a linear function of a register used at an entry of the procedure.

12. The method of claim 8, wherein a memory dereference within the first set of memory dereferences or the second set of memory dereferences comprises a tuple comprising an address of the memory dereference, a size of the memory dereference, and a type of the memory dereference.

13. The method of claim 8, wherein a second memory dereference within the second set of memory dereferences comprises a tuple comprising an address of the second memory dereference, a size of the second memory dereference, and a type of the second memory dereference.

14. A non-transitory computer-readable medium comprising machine-readable instructions that, when executed by a processor, cause a computing device to at least:
identify a procedure in a compiled binary application;
identify a superset of memory dereferences for the procedure occurring in a heap;
remove from the superset of memory dereferences a first memory dereference of the heap that depends on a value obtained by a second memory dereference of the heap to generate a first set of memory dereferences;
generate a first compiler independent hash value for the procedure, the compiler independent hash value representing the first set of memory dereferences occurring in the heap; and
determine that each memory dereference in the first set of memory dereferences of the first compiler independent hash value matches a respective memory dereference in a second set of memory dereferences of a second compiler independent hash value associated with a known procedure in a known source code file.

15. The non-transitory computer-readable medium of claim 14, wherein the machine-readable instructions when executed by the processor, further cause the computing device to at least:
remove from the superset of memory dereferences a third memory dereference occurring in the heap that is located within a loop in the procedure to generate the set of memory dereferences occurring in the heap.

16. The non-transitory computer-readable medium of claim 14, wherein the machine-readable instructions, when executed by the processor, further cause the computing device to at least:
remove from the superset of memory dereferences a third memory dereference occurring in the heap that occurs after at least one of a call instruction or an indirect jump.

17. The non-transitory computer-readable medium of claim 14, wherein the first memory dereference within the first set of memory dereferences comprises a tuple comprising an address of the memory dereference, a size of the memory dereference, and a type of the memory dereference.

18. The non-transitory computer-readable medium of claim 14, wherein a third second memory dereference within the second set of memory dereferences comprises a tuple comprising an address of the third memory dereference, a size of the third memory dereference, and a type of the third memory dereference.

19. The non-transitory computer-readable medium of claim 14, wherein the machine readable instructions further cause the computing device to at least remove from the superset of memory dereferences a third memory dereference that comprises an address that is not a linear function of a register used at an entry of the procedure.

20. A method comprising:
identifying a procedure in a compiled binary application;
identifying a superset of memory dereferences for the procedure occurring in a heap;
removing from the superset of memory dereferences a memory dereference occurring in the heap that comprises an address that is not a linear function of a register used at an entry of the procedure to generate a first set of memory dereferences occurring in the heap;
generating a first compiler independent hash value for the procedure, the compiler independent hash value representing the first set of memory dereferences occurring in the heap; and
determining that each memory dereference in the first set of memory dereferences of the first compiler independent hash value matches a respective memory dereference in a second set of memory dereferences of a second compiler independent hash value associated with a known procedure in a known source code file.

* * * * *